United States Patent
Tonooka et al.

(10) Patent No.: US 7,766,380 B2
(45) Date of Patent: Aug. 3, 2010

(54) AIRBAG COVER BODY AND AIRBAG APPARATUS

(75) Inventors: Daiei Tonooka, Wako (JP); Fumiharu Ochiai, Wako (JP); Yohei Kiuchi, Fuji (JP); Takashi Ueda, Fuji (JP)

(73) Assignees: Honda Motor Co., Ltd., Tokyo (JP); Nihon Plast Co., Ltd., Shizuoka (JP)

( * ) Notice: Subject to any disclaimer, the term of this patent is extended or adjusted under 35 U.S.C. 154(b) by 121 days.

(21) Appl. No.: 12/237,357

(22) Filed: Sep. 24, 2008

(65) Prior Publication Data
US 2009/0085332 A1 Apr. 2, 2009

(30) Foreign Application Priority Data
Sep. 27, 2007 (JP) .............................. 2007-251939

(51) Int. Cl.
*B60R 21/21* (2006.01)
(52) U.S. Cl. .............. 280/730.2; 280/728.2; 280/728.3; 280/743.1
(58) Field of Classification Search .............. 280/728.2, 280/728.3, 730.2, 743.1
See application file for complete search history.

(56) References Cited

U.S. PATENT DOCUMENTS

| 5,308,112 A | * | 5/1994 | Hill et al. ................. 280/730.2 |
| 5,324,072 A | * | 6/1994 | Olson et al. .............. 280/730.2 |
| 5,566,974 A | * | 10/1996 | Mazur et al. ............. 280/730.2 |
| 5,921,576 A | * | 7/1999 | Sinnhuber ................ 280/730.2 |
| 6,106,005 A | * | 8/2000 | Heinz et al. .............. 280/730.2 |
| 6,325,410 B1 | * | 12/2001 | Eyrainer .................. 280/730.2 |
| 6,371,514 B1 | * | 4/2002 | Bombard ................. 280/730.2 |
| 6,663,140 B1 | * | 12/2003 | Heinz ..................... 280/730.2 |
| 7,338,072 B2 | * | 3/2008 | Suekuni et al. .......... 280/730.2 |
| 7,374,201 B2 | * | 5/2008 | Chausset ................. 280/728.3 |
| 7,581,751 B2 | * | 9/2009 | Ochiai et al. ............. 280/730.2 |
| 2001/0042975 A1 | * | 11/2001 | David et al. .............. 280/730.2 |
| 2003/0107209 A1 | * | 6/2003 | Haig ........................ 280/749 |
| 2004/0212178 A1 | * | 10/2004 | Riesinger et al. ......... 280/730.2 |
| 2005/0057024 A1 | * | 3/2005 | Weston et al. ............ 280/730.2 |
| 2006/0061072 A1 | * | 3/2006 | Suekuni et al. .......... 280/730.2 |
| 2006/0208468 A1 | * | 9/2006 | Riester et al. ............ 280/730.2 |
| 2007/0023222 A1 | * | 2/2007 | Okamoto et al. ......... 180/274 |
| 2007/0052219 A1 | * | 3/2007 | Rust et al. ................ 280/730.2 |
| 2007/0057491 A1 | * | 3/2007 | Bayley .................... 280/730.2 |

FOREIGN PATENT DOCUMENTS

JP 2006-088731 4/2006

* cited by examiner

*Primary Examiner*—Paul N. Dickson
*Assistant Examiner*—Barry Gooden, Jr.
(74) *Attorney, Agent, or Firm*—McDermott Will & Emery LLC (57) ABSTRACT

An airbag is expanded upward on the side of a passenger from a door part. A cover body which covers the airbag is formed by overlaying an outer part made of a hard resin to an inner part made of a soft resin. A supporting piece part is protruded from the cabin external side of the inner part. A to-be-ripped part is formed on the supporting piece part. On expansion of the airbag, the to-be-ripped part is ripped, thereby allowing the door part to move rotationally on the cabin internal side. Therefore, the airbag equipped at the door part can be smoothly expanded along the side face part of the cabin. Thus, an airbag apparatus is improved in appearance.

6 Claims, 9 Drawing Sheets

AIRBAG COVER BODY AND AIRBAG APPARATUS

INCORPORATION BY REFERENCE

The present invention claims priority under 35 U.S.C. §119 to Japanese Patent Application No. 2007-251939 filed on Sep. 27, 2007. The content of the application is incorporated herein by reference in its entirety.

FIELD OF THE INVENTION

The present invention relates to an airbag cover for an airbag which is inflated and expanded on the side of a seat of an automobile, for example, and also to an airbag apparatus equipped with the airbag.

BACKGROUND OF THE INVENTION

Conventionally, there is known an airbag apparatus which inflates and expands an airbag to the side of a seat of an automobile, thereby protecting a passenger at the time of a side collision. Further, regarding this type of airbag apparatus, for example, as disclosed in Japanese Laid-Open Patent Publication No. 2006-88731, such a constitution is known that an airbag is folded and accommodated in a door part on the side of a cabin, the airbag is inflated and expanded upward from the door part, thereby protecting the head or others of a passenger. This patent document describes a constitution in which after assembly of an airbag and an inflator on inner panels of door parts, a cover panel is fitted so as to cover these members and the inner panels. Then, according to the above constitution, a hinge part is formed at the cabin internal side of the cover panel, and a lid part which moves rotationally upward on the base of the hinge part on expansion of the airbag is disposed along the upper edge of the cover panel.

However, in the above constitution, the lid part is disposed along the upper edge of the cover panel, and the edge portion of the lid part is disposed as a free end. Therefore, where a door opens and closes many times or a passenger presses a door trim, it is not easy to keep a favorable appearance of the lid part.

In this respect, such a constitution can be considered that one side of the lid part is given as a hinge part and the other side thereof is given as a tear line to rip on expansion of an airbag. However, this constitution is required to meet various requirements including characteristics of preventing the airbag from deteriorating in appearance due to provision of the tear line, securing the rigidity required for cover panels and attaining a smooth rip and rotational movement at a wide temperature range.

The above-described conventional cover body which covers an airbag used in an airbag apparatus for expanding the airbag upward from the door part is required to meet various requirements including characteristics of securing the rigidity, while keeping a favorable appearance of the airbag, and attaining a smooth rotational movement of a lid part.

The present invention has been made in view of the above situation, and an object of which is to provide an airbag cover body which keeps a favorable appearance to secure the rigidity and allows the lid part to move rotationally and smoothly on expansion of the airbag and also an airbag apparatus.

SUMMARY OF THE INVENTION

The airbag cover body of the present invention is an airbag cover body used in an airbag apparatus equipped with the airbag which is folded and accommodated in a door part on the side face part of a cabin and expanded upward along the side of the cabin upon introduction of gas, and the airbag cover body which is provided with an upper face panel part which covers the upper side of the thus folded and accommodated airbag, a side face panel part projected downward from the edge part of the cabin internal side of the upper face panel part, a first fitting/fixing part disposed at the side face panel part, a supporting piece part protruded downward from the lower face of the cabin external side of the upper face panel part, a second fitting/fixing part disposed at the supporting piece part, and a to-be-ripped part which is disposed at the supporting piece part, located above the second fitting/fixing part and ripped by pressure resulting from expansion of the airbag.

Then, in the above constitution, when gas is supplied into the airbag covered with the cover body, the airbag is inflated and expanded, thereby pressing the cover body from downward. Then, a to-be-ripped part of the supporting piece part rips, thereby allowing at least a part of the upper face panel part to move rotationally toward the cabin internal side, forming a channel for airbag outward inflation, by which the airbag is inflated and expanded upward from the channel for airbag outward inflation along the side face part of a cabin. The first fitting/fixing part disposed at the side face panel part and the second fitting/fixing part of the supporting piece part protruded downward from the upper face panel part are directly or indirectly connected to members on the side face part of a cabin to support them, by which the cover body is improved in rigidity and supported stably. Therefore, an airbag apparatus is improved in appearance.

According to the airbag cover body of the present invention, the upper face panel part is provided with a resin-made surface part and a backing part which is integrally joined to the lower face of the surface part and is made of a resin softer than the surface part, and the supporting piece part is formed integrally at the backing part.

Then, in the above constitution, the surface part which is relatively hard and the backing part which is relatively soft are overlaid, thereby forming the supporting piece part at which a to-be-ripped part is disposed integrally at the backing part. As a result, a divided part or the to-be-ripped part formed on the surface part is made small, and the channel for airbag outward inflation of the airbag is made large while the appearance is improved, making the airbag easy to expand smoothly.

Further, the airbag cover body of the present invention is provided with an edge strip part projected downward from the edge part of the cabin external side of the upper face panel part, in which the edge strip part is disposed so as to be spaced away from the cabin external side of the supporting piece part.

Then, in the above constitution, the edge strip part is disposed so as to be spaced away from the supporting piece part to the cabin external side, by which the edge of the side face part of a door part is covered with the edge strip part which is disposed as a free end, giving an improved appearance. A to-be-ripped part of the supporting piece part is ripped, thereby allowing the edge strip part to move rotationally together with the upper face panel part, forming the channel for expanding the airbag in a larger area, thus facilitating a smooth expansion of the airbag.

Further, according to the airbag cover body of the present invention, the to-be-ripped part is formed along the upper end part of the supporting piece part.

Then, in the above constitution, the supporting piece part which moves rotationally together with the upper face panel part on inflation and expansion of the airbag is made small, thus making it possible to suppress interference of the supporting piece part at the upper face panel part with the airbag to be inflated and expanded.

Further, according to the airbag cover body of the present invention, the to-be-ripped part is formed along a position which is spaced away from the upper end part of the supporting piece part.

Then, in the above constitution, on inflation and expansion of an airbag, the airbag to be inflated and expanded is guided by the supporting piece part which moves rotationally together with the upper face panel part, thereby interference of the airbag with other members of the cover body is suppressed and the airbag can be guided to the cabin external side.

Further, the airbag apparatus of the present invention includes an airbag folded and accommodated in a door part on the side of a cabin and expanded upward along window parts on the side of the cabin upon introduction of gas, an inflator which supplies gas into the airbag, an airbag cover body which includes an upper face panel part covering the upper side of the folded and accommodated airbag, a side face panel part projected downward from the edge part of the cabin internal side of the upper face panel part to constitute an interior trim material of the door part, a first fitting/fixing part disposed on the side face panel part, a supporting piece part protruded downward from the lower face of the cabin external side of the upper face panel part, a second fitting/fixing part disposed on the supporting piece part, and a to-be-ripped part disposed at the supporting piece part and positioned above the second fitting/fixing part to be ripped due to pressure resulting from the expansion of the airbag, and a fitting body which supports the airbag and the inflator and provided with a first fitting/receiving part to which the first fitting/fixing part of the cover body is fitted and a second fitting/receiving part to which the second fitting/fixing part is fitted, and is fitted to a member of the door part.

Then, in the above constitution, since the cover body is provided, upon supply of gas into the airbag covered with the cover body, the airbag is smoothly inflated and expanded upward along the side of a cabin. Therefore, the cover body is stably supported, and an airbag apparatus is improved in appearance.

As described above, according to the present invention, upon supply of gas into the airbag covered with the cover body, the airbag can be smoothly inflated and expanded upward along the side face of the cabin. Therefore, the cover body is stably supported to give an improved appearance to the airbag apparatus.

BRIEF DESCRIPTION OF THE DRAWINGS

FIG. 2 is a view for explaining a state that the airbag apparatus is fitted to a door part, that is, FIG. 2(a) shows a state before expansion of the airbag apparatus; FIG. 2(b) shows a state upon expansion thereof.

DETAILED DESCRIPTION OF THE INVENTION

Hereinafter, a description is given for an embodiment of the airbag cover body and the airbag apparatus in the present invention with reference to the drawings.

Figure 2:
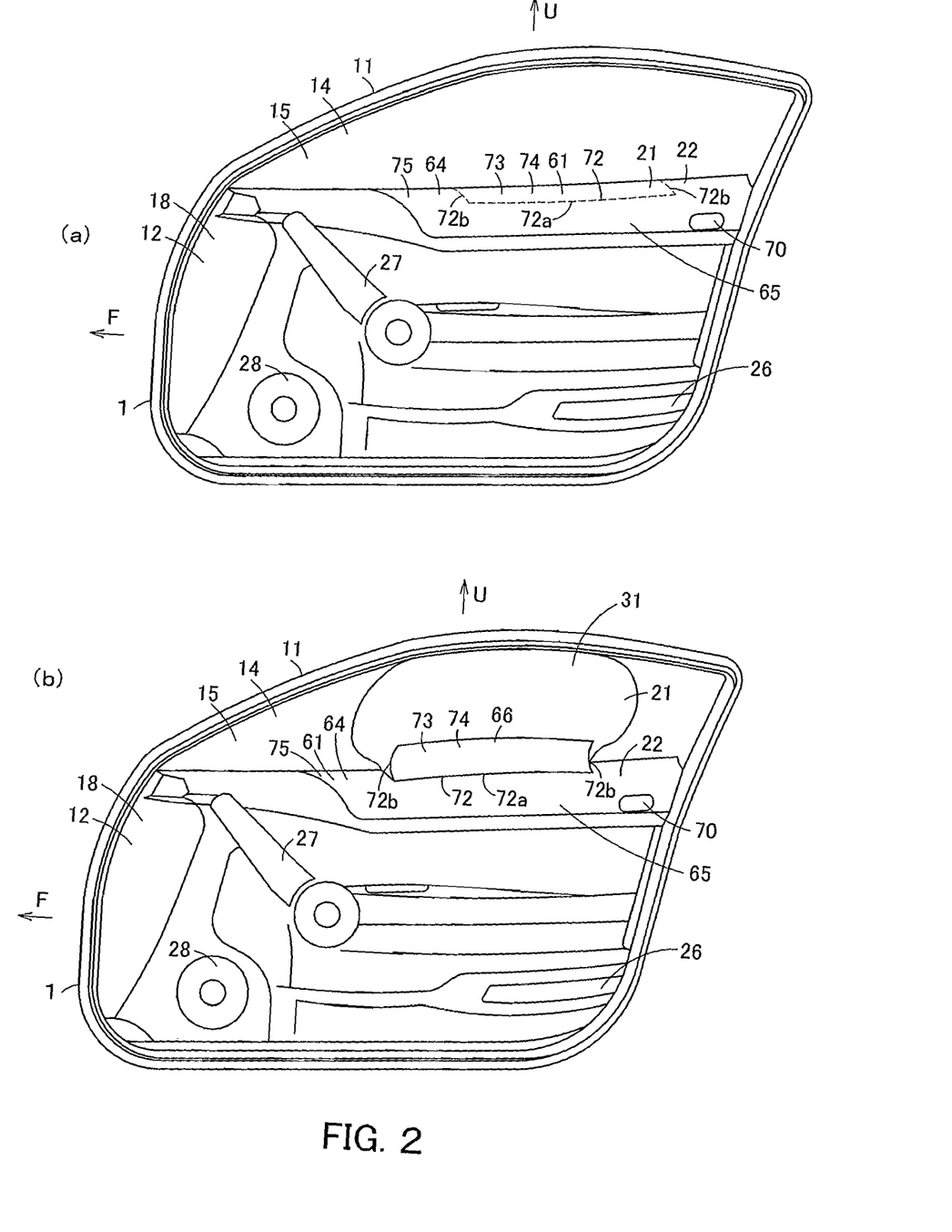
Figure 3:
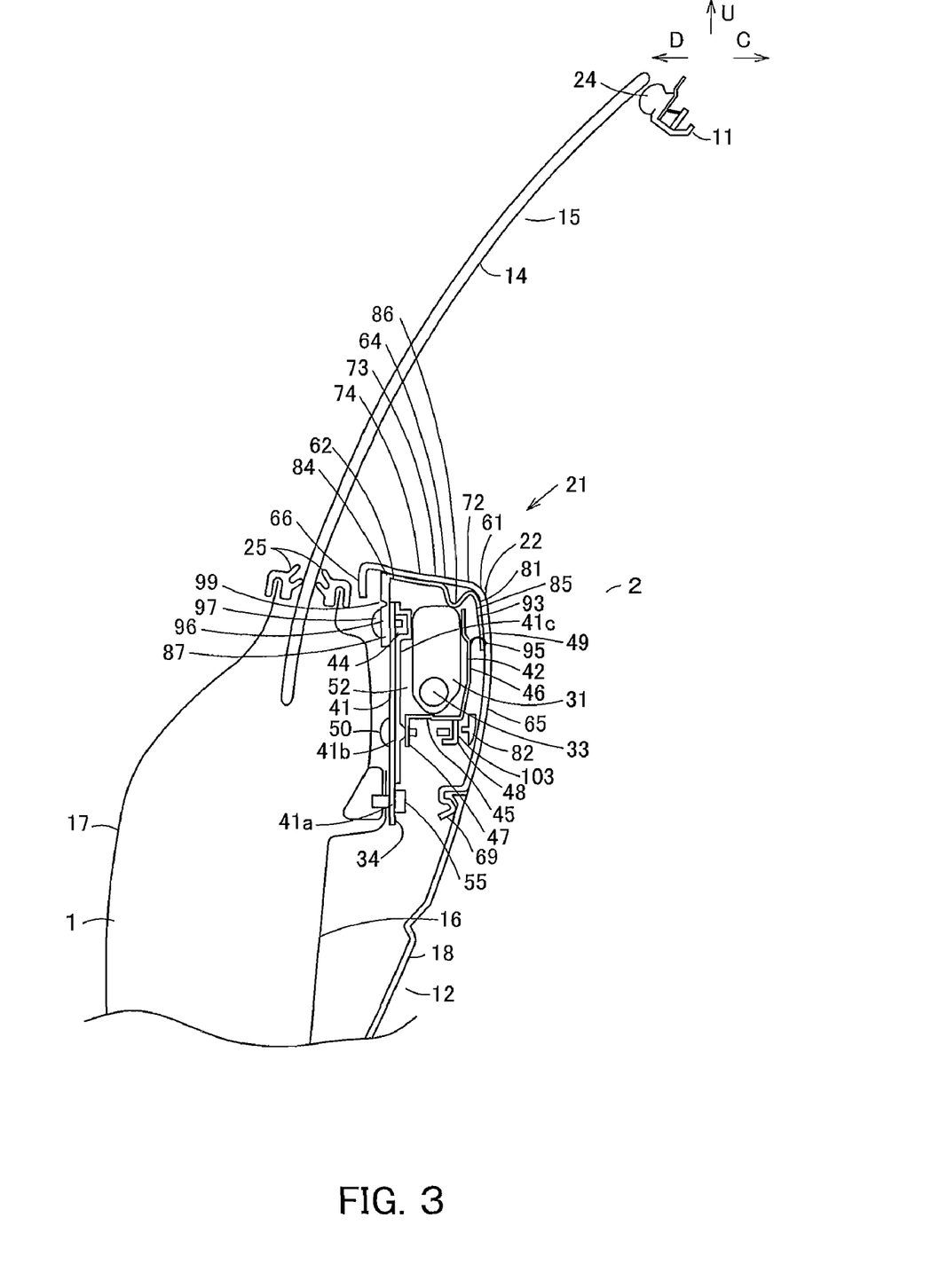
FIG. 3 is a view for explaining a state that the airbag apparatus is fitted to the door part.

In FIG. 2 and FIG. 3, reference numeral 1 denotes a door part which constitutes a body of an automobile, and the door part 1 is located on the side of a seat disposed in a cabin 2. It is noted that on the basis of a direction in which a vehicle advances straight, a description is given for upward (a direction indicated by the arrow U in FIG. 3), the cabin internal side which is a direction moving from the door part 1 to the center of the cabin 2 (a direction indicated by the arrow C in FIG. 3), the cabin external side which is a direction moving from the center of the cabin 2 to the door part 1 (a direction indicated by the arrow D in FIG. 3), forward (a direction indicated by the arrow F in FIG. 2) or others.

Then, the door part 1 is equipped with a frame 11 enclosing a whole part of the door part 1 in a frame manner, in which the lower side part of the frame 11 is a door body part 12, the upper side part of the frame 11 is a windshield, an opening is opened or closed by a window glass 14 called a side glass or a side window glass, thereby giving a window part 15 which constitutes the side face part, that is, a predetermined face. Then, the door body part 12 is equipped with an inner panel 16 which is a to-be-fitted member formed of a metal plate or the like as a member and an outer panel 17 located so as to be spaced away at the cabin external side of the inner panel 16 and formed of a metal plate or the like. Then, the cabin internal side of the inner panel 16 is covered with a main door trim 18 which is an interior trim material formed partially with a resin or the like, and a part of the rear part of the upper side constitutes an airbag apparatus 21 and is covered with a cover body 22 which is an interior trim material. It is noted that in FIG. 3, reference numerals 24, 25 denote seal members also called a weather strip firmly attached to the window glass 14 in the vertical direction. Further, in FIG. 2, reference numeral 26 denotes an accommodation part; 27, a grip part for opening and closing a door; and 28, a speaker.

Then, the airbag apparatus 21 is an occupant crash protection, or a so-called door mount-type airbag for protecting the head of a passenger mainly at the time of a side collision or rolling over of a vehicle. It includes not only cover body 22 but also an airbag 31 formed in a bag shape, an inflator 33 which is a gas generator for supplying gas into the airbag 31 and a fitting body 34 to which the cover body 22, the airbag 31 and the inflator 33 are fitted. These members are combined to constitute an airbag module. Further, a controller is connected to the airbag apparatus via a harness (not illustrated).

Then, the airbag 31 is constituted to form a flat bag shape by seaming a single or a plurality of base fabrics, for example, by seaming the outer peripheral parts of a main panel which are two base fabrics approximately similar in configuration. Then, during normal times, the airbag is folded into a small size in a roll shape or a bellows shape according to a predetermined method.

Further, the inflator 33 is equipped with an inflator body part which is formed approximately in a cylindrical shape. A gas ejection part is disposed at one end of the inflator body part, while a connector is disposed at the other end thereof, and a harness is connected to the connector. Then, the inflator 33 receives an ignition signal via the harness from the controller, thereby allowing an internally filled propellant to react or releasing gas reserved in a container, by which gas is ejected from the gas ejection part to supply gas into the airbag 31 directly or via a pipe 33a shown in FIG. 1.

Still further, the fitting body 34 is constituted integrally, for example, with metal or in combination with a plurality of members. In the present embodiment, it is constituted by combining a plate 41 with a retainer 42 fixed to the plate or with others. Then, plate 41, which is a metal plate body formed in a perpendicular flat shape, is provided with a vehicle body fitting part 41a at the lower side part, with a retainer fitting part 41b at a position midway in the height direction, and with a second fitting/receiving part 44 at the upper side part. A protective face part 41c for protecting the airbag 31 is disposed on the cabin internal side face of the plate 41, whenever necessary. Further, the retainer 42 is formed, for example, by extrusion molding of metal. And a horizontal bottom plate part 45, a perpendicular inner plate part 46 projected upward from the edge part of the cabin internal side of the bottom plate part 45, a fitting plate part 47 projected downward from the edge part of the cabin external side of the bottom plate part 45, and a cover lower-part locking part 48 formed in approximately an L-letter shape in its cross section to constitute the first fitting/receiving part protruded downward from the vicinity of the edge of the cabin internal side of the bottom plate part 45 are formed in an integrated manner. Further, as shown in FIG. 3, a cover middle-part locking part 49 formed in a circular arc shape in its cross section to constitute the first fitting/receiving part is formed at the cabin internal side of the inner plate part 46, whenever necessary. Then, a fixture 50 such as a rivet is used to fit the fitting plate part 47 to the retainer fitting part 41b of the plate 41, thereby constituting a fitting body 34. Then, with this state is kept, an upper side of an accommodation part 52 opens constituted at a part which is enclosed by the plate 41, the bottom plate part 45 and the inner plate part 46. The folded airbag 31, the inflator 33 and others are accommodated in the accommodation part 52. Then, the vehicle body fitting part 41a is fitted to the inner panel 16 by using a fixture 55 such as a rivet, and the fitting body 34 is fitted to the door part 1.

In addition, the cover body 22 is also called a lid, and, as shown in FIG. 1 through FIG. 8, constituted as an overlaid body obtained by overlaying a resin-made outer part 61 on the surface side, which is on the cabin 2 side, and a resin-made inner part 62 which is fitted to the back face of the outer part 61 by vibration welding or the like.

Figure 4:
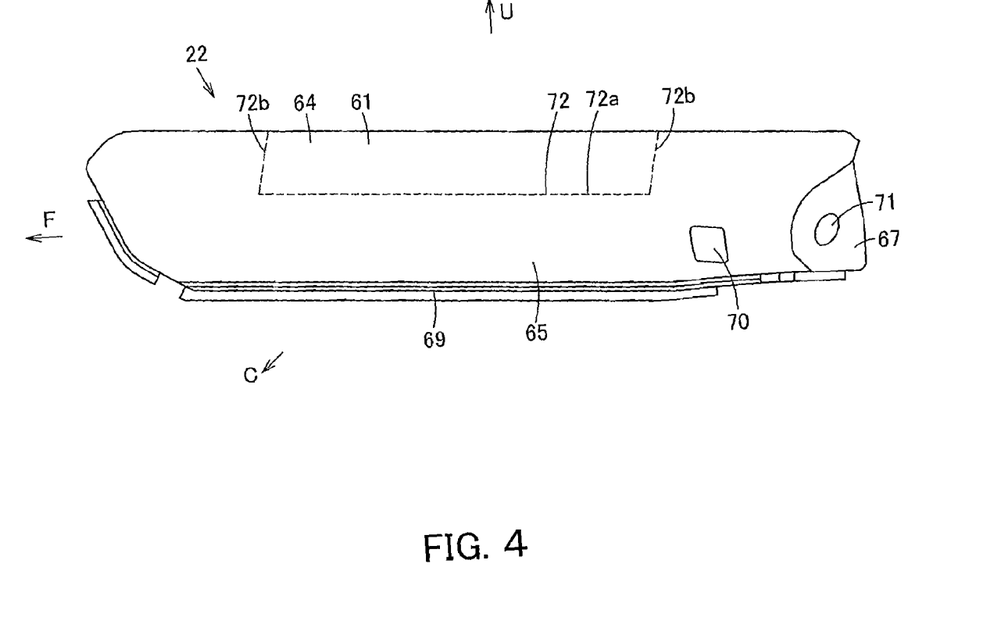
FIG. 4 is a perspective view showing the airbag cover body apparatus when viewed from the cabin internal side.
Figure 5:
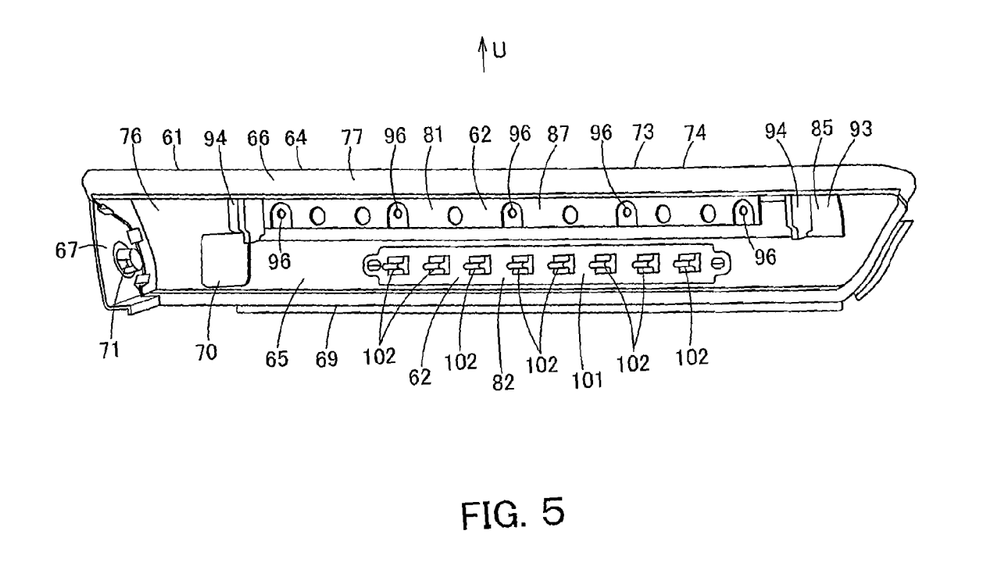
FIG. 5 is a perspective view showing the airbag cover body apparatus when viewed from the cabin external side.
Figure 6:
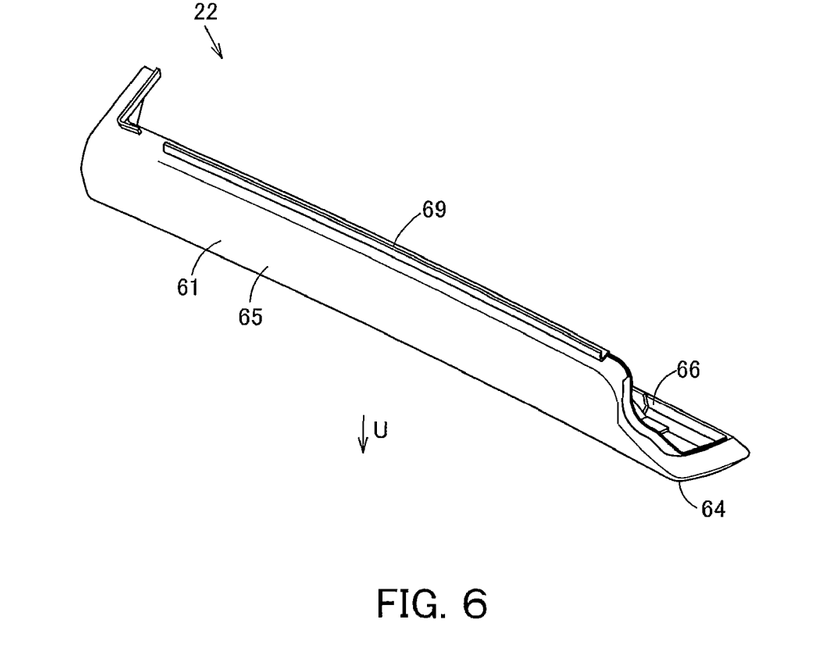
FIG. 6 is a perspective view showing the airbag cover body apparatus when viewed from downward.

Next, the outer part 61 is formed in a continuous shape to the main door trim 18, thereby constituting an interior trim material covering the door body part 12, together with the main door trim 18. In other words, the outer part 61 is equipped with an upper face panel part 64 covering the upper side of the door body part 12, a side face panel part 65 continuing to the edge of the cabin internal side of the upper face panel part 64 to act as a body part projected downward, an edge strip part 66 continuing to the edge of the cabin external side of the upper face panel part 64 and projected downward from the side face panel part 65 in a shorter length, and a rear-side face panel part 67 formed in an integrated manner or in separation, continuing to the rear edges of the upper face panel part 64, side face panel part 65 and edge strip part 66, thereby covering the rear-side face. Then, the upper face panel part 64 is formed in a flat surface shape or a curved surface shape, depending on a design of the door part 1. In the present embodiment, it is formed in an inclined surface shape moving toward the cabin external side slightly upward, covering a seal member 25 of the door part 1 and others so that they are not visible from the cabin 2. Further, the side face panel part 65 is formed in a curved surface shape depending on a configuration of the main door trim 18, provided at the lower edge with a trim connecting part 69 connected to the main door trim 18 on engagement therewith and also at a part of the lower side with a side cap part 70 formed in an appropriate shape for allowing other components to be exposed or maintenance work to be performed. Still further, the edge strip part 66 is projected substantially in a perpendicular manner, with the edge portion facing downward, via an inclined intermediate plate part formed depending on a design requirement. In addition, the edge strip part 66 is also called a winding part, covering the interior of the door part 1 so as not to be exposed, thereby giving an improved appearance, in a constitution that the upper face panel part 64 is set to be high in order to keep the seal member 25 or the like invisible from the cabin 2 and give an improved appearance. Further, the rear-side face panel part 67 is called a lid cover and provided with a rear-side cap part 71 for inserting a harness or the like, as shown in FIG. 4 and FIG. 5.

Then, a division part 72 is formed at the outer part 61, and an outer door part 74 which constitutes a door part 73 is formed on the internal side divided by the division part 72. Next, the division part 72 is a thin and weak part as a door to-be-lined part, which is recessed by cutting the upper face panel part 64 of the outer part 61 and the lower face of the edge strip part 66, and formed to be weaker than other parts, thereby acting as a tear line or a hinge. As shown in FIG. 2 and FIG. 4, the division part 72 is formed approximately in a U-letter shape with corners and equipped with a long side part 72a extending back and forth along a connecting part with the side face panel part 65 on the cabin internal side of the upper face panel part 64 or along the vicinity of the connecting part and a short side part 72b extending from the anterior or the posterior end of the long side part 72a toward the cabin external side and reaching the edge of the edge strip part 66. In other words, the division part 72 partially or wholly rips by pressure resulting from inflation and expansion of the airbag 31, during normal times, a portion of the short side part 72b rips as an outer rip part, and the long side part 72a which did not rip is to function as a hinge part which is easily deformed and bent. Then, the external side of the division part 72 is an outer hull part 75, or a non-expansion part which does not expand on inflation and expansion of the airbag 31.

Figure 1:
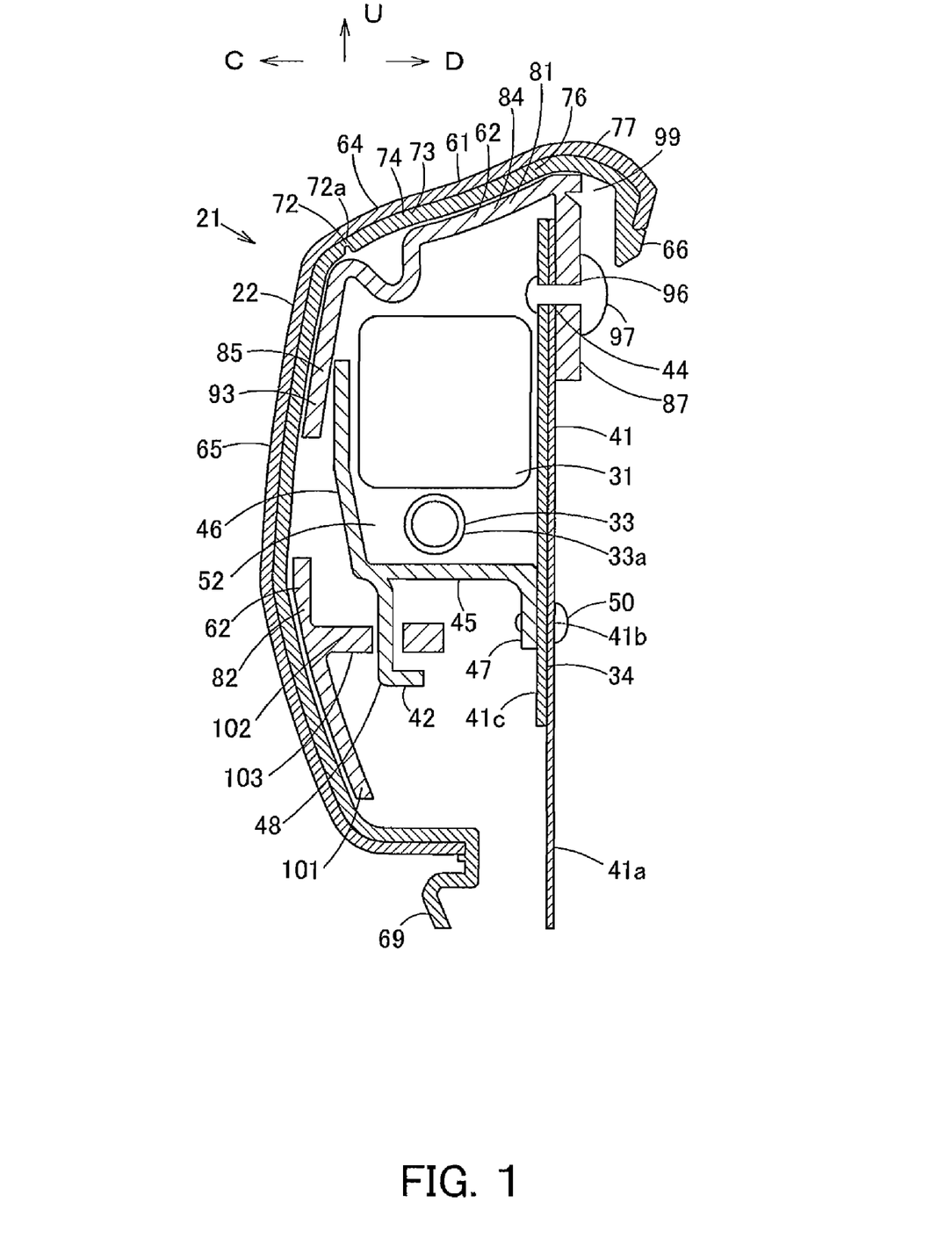
FIG. 1 is a view for explaining an embodiment of the airbag apparatus of the present invention.

In addition, the outer part 61 is mainly made of a hard resin. In the present embodiment, as shown in FIG. 1, it is formed by decorating thinly and integrally a surface layer 77, which is a polyurethane foam (PUR) surface for improving the appearance and feeling, on the surface of an outer part base body 76 as a surface part obtained by injection molding of polypropylene (PP) or a so-called hard resin.

On the other hand, the inner part 62 is made of a soft resin which is a material softer than a material constituting the outer part base body 76 of the outer part 61. In the present embodiment, the first backing part 81 and the second backing part 82 as a backing part are respectively made by injection molding of a TPO resin (thermoplastic olefin), that is, an elastomer-based resin. Then, the first backing part 81 is located at the back face of the upper side of the upper face panel part 64 and of the side face panel part 65 and fitted integrally to the outer part 61 by vibration welding or the like, while the second backing part 82 is located at the back face of the lower side of the side face panel part 65 and fitted integrally to the outer part 61 by vibration welding or the like. It is noted that in steps of producing the cover body 22, the outer part base body 76 of the outer part 61 and the first and the second backing parts 81 and 82 of the inner part 62 are individually formed, and the first backing part 81 is fitted to the back face of the outer part base body 76 by vibration welding. Then, the surface layer 77 is formed on the surface of the outer part base body 76 by reaction injection molding, and the second backing part 82 is finally fitted to the back face side of the outer part base body 76 by vibration welding.

Then, as shown in FIG. 1, FIG. 3, FIG. 5 and FIG. 8, formed integrally at the first backing part 81 are an inner door part 84 which is fitted at the back face side of the outer door part 74 of the outer part 61 and constitutes the door part 73, an inner hull part 85 which is fitted at the back face side of the outer hull part 75 of the outer part 61 and constitutes a non expansion part, a hinge part 86 which connects the inner door part 84 with the inner hull part 85 on cabin internal side so as to deform freely, and a supporting piece part 87 protruded downward or in a reverse expansion direction from the cabin external side of the inner door part 84.

Figure 8:
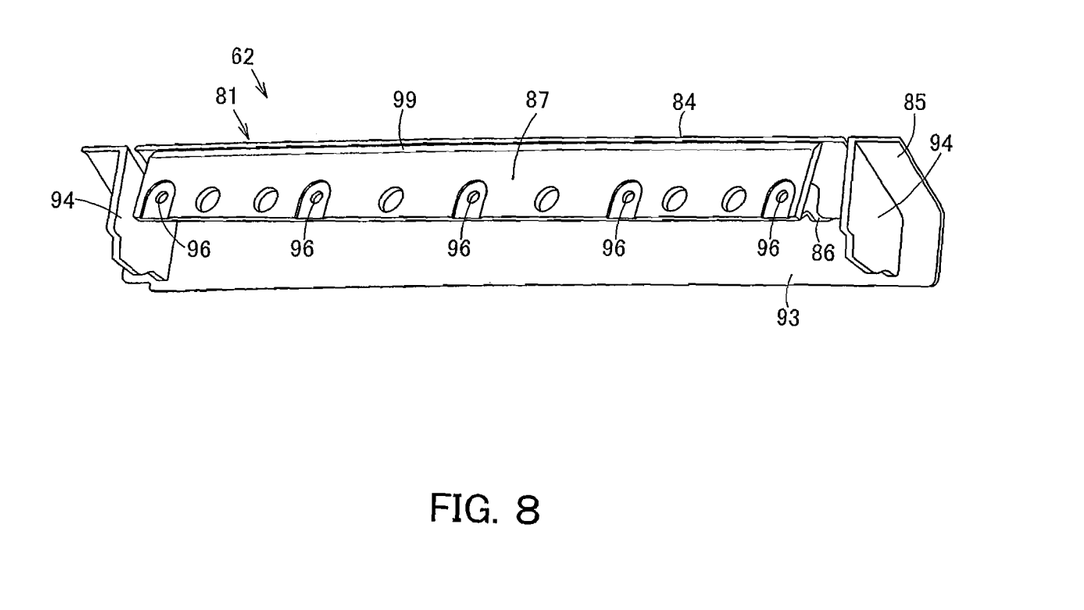
FIG. 8 is a perspective view showing a first backing part of an inner part of the airbag cover body apparatus.

Then, the inner door part 84 is formed in a plate shape which is welded by being firmly attached to the back face of the outer door part 74.

Further, the inner hull part 85 is equipped with a plate-like inner hull base part 93 welded by being firmly attached to the back face of the outer hull part 75 and an inner hull end plate part 94 protruded in a perpendicular plate shape from the longitudinal direction of the inner hull base part 93, that is, the vicinity of both ends thereof in the front-back direction. Then, the inner hull base part 93 is formed in a plate shape curved along the configuration of the outer hull part 75 so as to enclose the inner door part 84 in three directions and also, as shown in FIG. 3, a lock receiving part 95 which is locked by the cover middle-part locking part 49 of the fitting body 34 is formed, if necessary.

Then, the hinge part 86 connects the edge of cabin internal side of the inner door part 84 with the inner hull part 85 so as to be deformed, that is, the door part 73 is supported by connecting so as to expand or move rotationally with respect to a non expansion part at the center of the axis along the front-back direction. Then, the hinge part 86 faces the long side part 72*a* of the division part 72 of the outer part 61 and expands out in a curved manner downward approximately in a U-letter shape with corners so as to be across the long side part 72*a*. Further, the hinge part 86 is divided into a plurality of pieces by a slit running along the external/internal direction.

In addition, a part between the anterior and posterior ends of the inner door part 84 and the inner hull part 85 is given as a part facing the short side part 72*b* of the division part 72. This part can be formed as a thin-wall to-be-ripped part. In the present embodiment, it is formed as a slit, which is a cut groove.

Further, the supporting piece part 87 is an airbag module fixing part which may be called an inner longitudinal wall and protruded downward in a perpendicular plate shape from the vicinity of the end of the cabin external side of the inner door part 84. Then, a plurality of circular-hole shaped second fitting/fixing parts 96 are disposed at the front edge side of the supporting piece part 87, that is, at the lower end side thereof, and the supporting piece part 87 is fitted to the second fitting/receiving part 44 of the fitting body 34 by a fixture 97 such as a bolt inserted into the second fitting/fixing part 96. Then, a to-be-ripped part 99 is formed at the supporting piece part 87 so as to be located at the upper end part, that is, along the lower face of the first backing part 81 and spaced away above the second fitting/fixing part 96. The to-be-ripped part 99 may be called an inner rip part, is formed in a groove shape which is recessed on the cabin external side. And, it is formed to be weaker than other parts of the supporting piece part 87 and rips by pressure resulting from inflation and expansion of the airbag 31.

Further, the second backing part 82 is called a lower-part supporting part in which a plate-like base plate part 101 welded by being firmly attached to the lower side part at the back face of the outer door part 74 is formed integrally with a plurality of supporting plate parts 102 protruded from the base plate part 101 to the cabin external side, that is, at the back face side thereof. Then, a through hole-shaped lock receiving part 103 at which the cover lower-part locking part 48 of the fitting body 34 is formed as a first fitting/fixing part at each of the supporting plate parts 102.

Still further, a controller connected to the inflator 33 of the airbag apparatus 21 is provided with a CPU and connected to a single or a plurality of sensors, thereby sending an ignition signal for actuating the inflator 33, depending on the situation of a passenger, collision and an angle of a vehicle body.

Therefore, as shown in FIG. 1 and FIG. 3, the airbag apparatus 21 is constituted as an airbag module in which the inflator 33 and the folded airbag 31 are accommodated in an accommodation part 52 of the fitting body 34 and these members are covered with the cover body 22. Then, on the cover body 22, a lock receiving part 95 of the first backing part 81 is locked at the cover middle-part locking part 49 of the fitting body 34, a lock receiving part 103 of the second backing part 82 is locked at the cover lower-part locking part 48 of the fitting body 34, and the second fitting/fixing part 96 of the supporting piece part 87 is fitted to the second fitting/receiving part 44 of the fitting body 34 by a fixture 97 inserted from the cabin external side. Thereby, during normal times, the airbag apparatus 21 is constituted in a state that the cover body 22 is fixed.

Then, the inflator 33 is electrically connected to the controller, the vehicle body fitting part 41*a* of the fitting body 34 is fitted to the inner panel 16 of the door part 1 by using a fixture 55, and the trim connecting part 69 at the lower end of the cover body 22 is engaged with the main door trim 18, by which the airbag apparatus 21 is installed at the door part 1.

Next, a description is given for motions of the airbag apparatus 21 on expansion.

Figure 9:
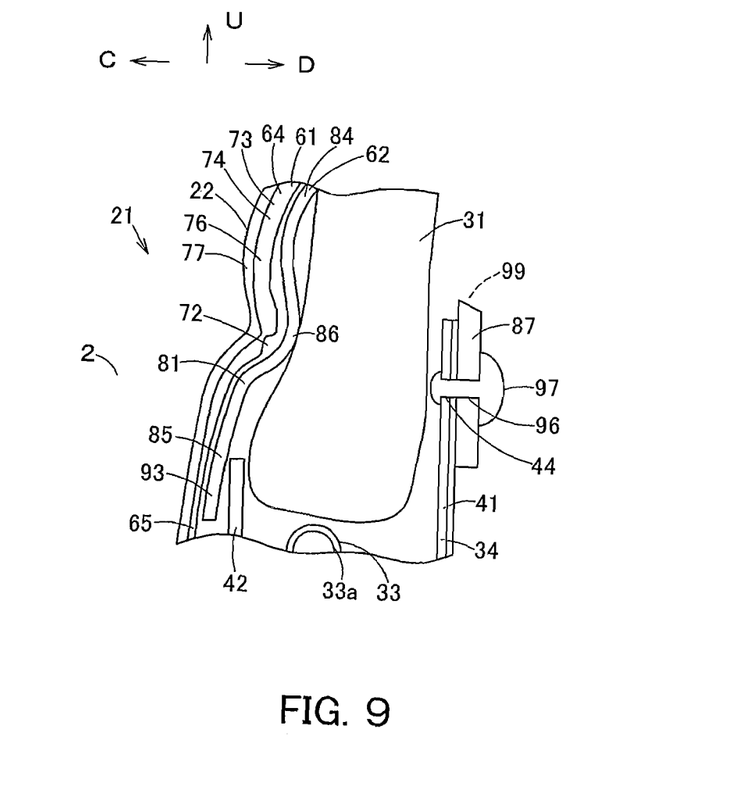
FIG. 9 is a view for explaining motions of the airbag apparatus on expansion.

When the body of an automobile is subjected to impact by a side collision or rolled over in a state that the airbag 31 is accommodated as shown in FIG. 1, FIG. 2(*a*) and FIG. 3, control means actuates the inflator 33 according its decision based on a signal from a sensor or the like, thereby supplying gas into the airbag 31. Then, the airbag 31 starts to be inflated and expanded toward the upper side on which an accommodation part 52 opens, thereby pressing a door part 73 of the cover body 22. Then, as shown in FIG. 9, a to-be-ripped part 99 of the supporting piece part 87 of the inner part 62 rips due to the thus pressing pressure, thereby the division part 72 is ripped in whole or in part, and at least the short side part 72b is ripped. Then, when the airbag 31 is further inflated and expanded, the door part 73 pressed by the airbag 31 is allowed to move rotationally to the cabin internal side on the basis of the long side part 72a of the outer part 61 and the hinge part 86 of the inner part 62, thereby forming a channel for airbag outward inflation of the airbag 31. Where the long side part 72a of the division part 72 at the outer part 61 is not ripped but kept connected, the long side part 72a acts as a supporting point, the hinge part 86 is deformed so as to extend, and the door part 73 moves rotationally in a smooth manner. Further, where the long side part 72a is ripped, the hinge part 86 acts as a supporting point, while being deformed so as to extend, and the door part 73 moves rotationally in a smooth manner. Then, the airbag 31 ejected from the ejection port allows the door part 73 to move rotationally, being smoothly inflated and expanded upward along a window part 15, as shown in FIG. 2(*b*) via a clearance between the door part 73 and the window part 15, thereby restraining a passenger from moving to the side and protecting the head or others.

As described above, according to the present embodiment, in a so-called door mount-type airbag which inflates and expands the airbag 31 accommodated inside the door part 1 upward from the upper face of the door part 1, outer part 61 and the inner part 62 are overlaid to constitute a cover body 22 to provide a to-be-ripped part 99 at the supporting piece part 87 of the inner part 62, thereby making a division part or a to-be-ripped part smaller which is a seam formed on the outer part base body 76 of the outer part 61, well securing design characteristics and giving an improved appearance. Further, the cover body 22 is allowed to move rotationally to the edge strip part 66 on the cabin external side, a channel for airbag outward inflation 31 is made large, thus making it possible to inflate and expand the airbag 31 smoothly. Then, on inflation and expansion of the airbag 31, it will be sufficient that only the to-be-ripped part 99 disposed at the supporting piece part 87 of the inner part 62 and at least the short side part 72b of the division part 72 disposed at the outer part 61 are ripped. Therefore, the door part 73 is allowed to move rotationally in a smooth manner so as to inflate and expand the airbag 31 smoothly at a wider temperature range.

Further, the cabin internal side of the cover body 22 is fixed in such a manner that the lock receiving part 95 of the first backing part 81 is locked at the cover middle-part locking part 49 of the fitting body 34, and the lock receiving part 103 of the second backing part 82 is locked at the cover lower-part locking part 48 of the fitting body 34, and the cabin external side of the cover body 22 is fixed in such a manner that the second fitting/fixing part 96 of the supporting piece part 87 is fixed at the second fitting receiving part 44 of the fitting part 34 by a fixture 97, therefore, the cover body 22 is improved in rigidity and fitted stably without slackening. Thus, where the door part 1 opens or closes and where a force is applied to the cover body 22 by a passenger, the cover body 22 is not deformed to maintain a favorable appearance.

Then, the supporting piece part 87 rips at the to-be-ripped part 99 on inflation and expansion of the airbag 31. Since the to-be-ripped part 99 is formed along the upper end part of the supporting piece part 87, the supporting piece part 87 which moves rotationally together with the upper face panel part 64 on inflation and expansion of the airbag 31 is made small, thus making it possible to suppress interference of the supporting piece part 87 at the upper face panel part 64 with the airbag 31 to be inflated and expanded.

Further, the airbag apparatus 21 is provided with the inflator 33 and the airbag 31 at the fitting body 34, and the airbag module is constituted in a state that the cover body 22 constituting a part of a door trim is fitted to the fitting body 34. By making the airbag apparatus 21 into a module, it is possible to improve the work efficiency related to storage, transport and assembly to a vehicle body.

Further, since the door part 73 of the cover body 22 moves rotationally to the cabin internal side, the airbag 31 is guided to the cabin external side, thus making it possible to expand the airbag 31 smoothly along the window glass 14 of the window part 15.

Still further, since there is provided the edge strip part 66 disposed spaced away from the supporting piece part 87 toward the cabin external side, the edge of the window part 15 constituting the side face part of the door part 1 is covered with the edge strip part 66 which is given as a free end, thereby giving an improved appearance. Then, the to-be-ripped part 99 of the supporting piece part 87 is ripped, by which the edge strip part 66 is allowed to move rotationally together with the door part 73 of the upper face panel part 64, a channel for airbag outward inflation of the airbag 31 is made large, by which it is possible to expand the airbag 31 smoothly.

As described above, it is possible to easily realize both improvements in appearance due to provision of the edge strip part 66 and a smooth inflation and expansion of the airbag 31 at the same time.

Figure 7:
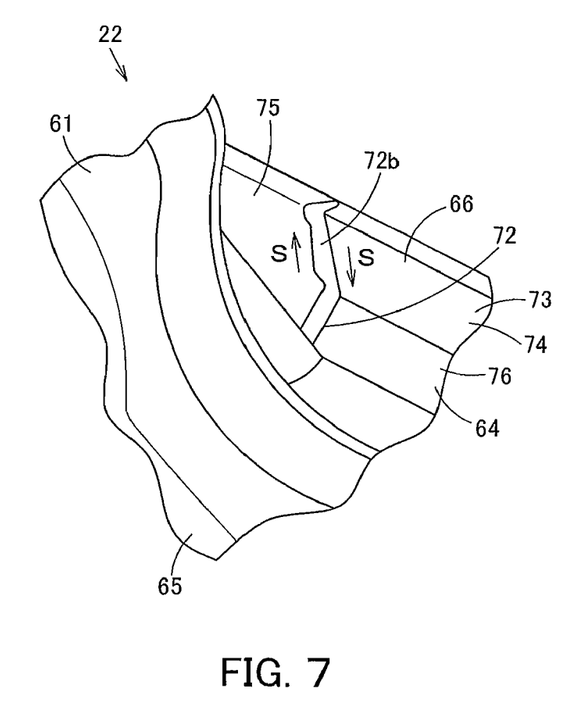
FIG. 7 is a perspective view in which the airbag cover body apparatus is partially enlarged.
Figure 10:
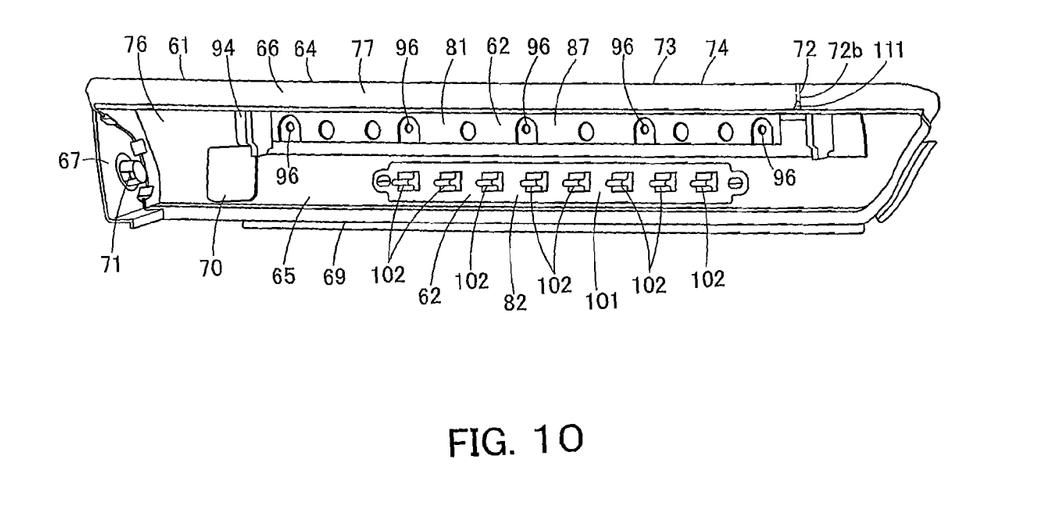
FIG. 10 is a perspective view showing an airbag apparatus of another embodiment of the present invention when viewed from the cabin external side of the cover body.
Figure 11:
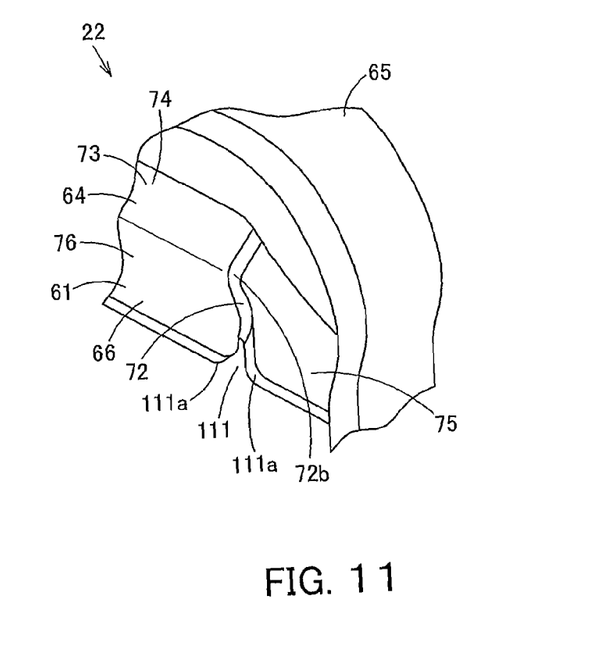
FIG. 11 is a perspective view in which the airbag apparatus is partially enlarged.

In the above embodiment, the short side part 72b and the long side part 72a of the division part 72 are respectively recess grooves obtained by recessing linearly the outer part base body 76 of the outer part 61. However, the present invention shall be not limited to this shape. For example, in the above embodiment, as shown in FIG. 7, the cover body 22 is equipped with an edge strip part 66 formed in a winding shape, and at a part of the edge strip part 66, as shown in the arrow S, a force ripping the outer part 61 of the cover body 22 is given as a force along a planar direction of the edge strip part 66, or a so-called force in a shearing direction. Therefore, on the assumption that the division part 72 at the part of the edge strip part 66 is to be made great in length, it can be considered that the division part 72 at the part of the edge strip part 66 may not rip easily and smoothly. Therefore, as shown in FIG. 10 and FIG. 11, at the part of the edge strip part 66, the short side part 72b of the division part 72 is notched from the edge to a position not deteriorating the appearance, thus forming a notch 111. It is, thereby, possible to rip the division part 72 at the part of the edge strip part 66 easily and smoothly. It is noted that the notch 111 is formed to a position not deteriorating the appearance and after formation of the notch 111 at the outer part base body 76, and the notch 111 is covered with a urethane-made surface layer so that the appearance can be improved. Further, as shown in FIG. 11, the notch 111 is provided with a corner 111a at the edge portion which is curved, by which the cover body 22 can smoothly come in contact with the airbag 31 to be inflated and expanded.

Figure 12:
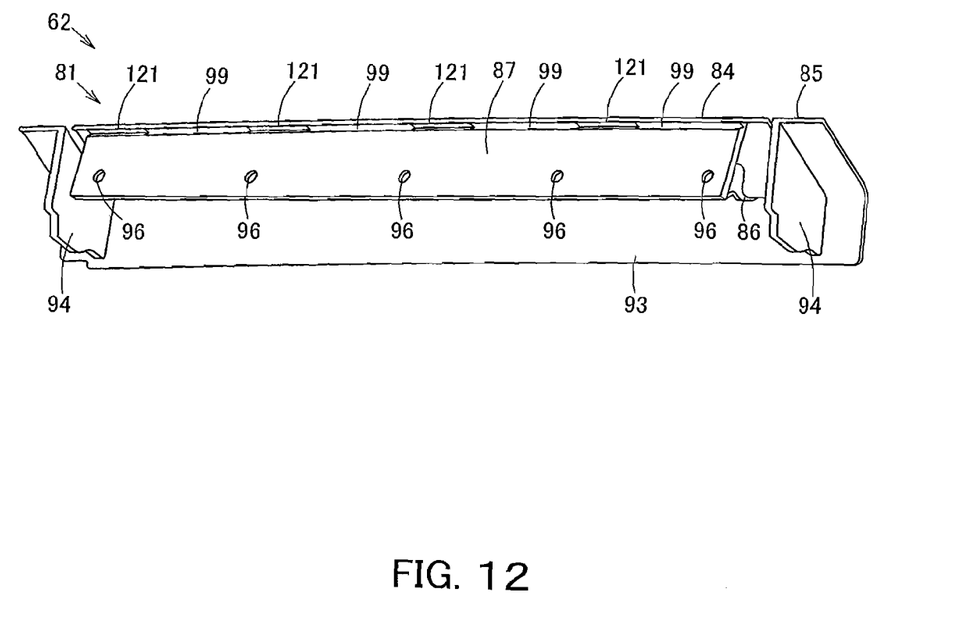
FIG. 12 is a perspective view showing the first backing part of the inner part of the cover body of an airbag apparatus which is still another embodiment of the present invention.

Further, in the above embodiment, the supporting piece part 87 is made into a flat plate and the to-be-ripped part is made into a linear recess groove running along the longitudinal direction of the supporting piece part 87. However, the present invention shall not be limited to the above constitution. For example, in most cases, the inflator 33 is disposed at the front side or rear side of the airbag 31, and gas is introduced to the airbag 31 from the front end side or rear end side in the longitudinal direction of the inflator via a pipe 33a. Then, on the inflator 33 side, that is, at a part close to a part at which gas is introduced and at a part distant from the part, there is a difference in time when the gas is introduced and pressure which is applied to the gas, and the part close to the inflator 33 will be ripped more quickly in the case of the cover body 22 which is greater in the longitudinal dimension. Thus, for example, as shown in FIG. 12, slit parts 121, which are through holes, are formed on the to-be-ripped part 99 in a predetermined interval, thereby dividing the to-be-ripped part 99 into a plurality of parts to reduce the strength of the to-be-ripped part 99, thus making it possible to rip all over the length of the airbag easily and smoothly. In other words, the to-be-ripped part 99 can be ripped smoothly even at a part which is distant from the inflator 33 and at which the edge strip part 66 is disposed. Further, the slit parts 121 are formed in a predetermined interval, and the to-be-ripped part 99 is made long, that is, the slit part 121 is made short on the side close to the inflator 33, while the to-be-ripped part 99 is made short, that is, the slit part 121 is made long, as moving away from the inflator 33, thus making it possible to rip the to-be-ripped part 99 in the longitudinal direction substantially at the same time and expand the airbag 31 uniformly along the longitudinal direction. Further, the to-be-ripped part 99 is divided by the slit part 121 but the supporting piece part 87 is not divided, by which the supporting piece part 87 is improved in rigidity, the second fitting/fixing part 96 of the supporting piece part 87 can be fitted more efficiently too the members by the fixture 97.

Figure 13:
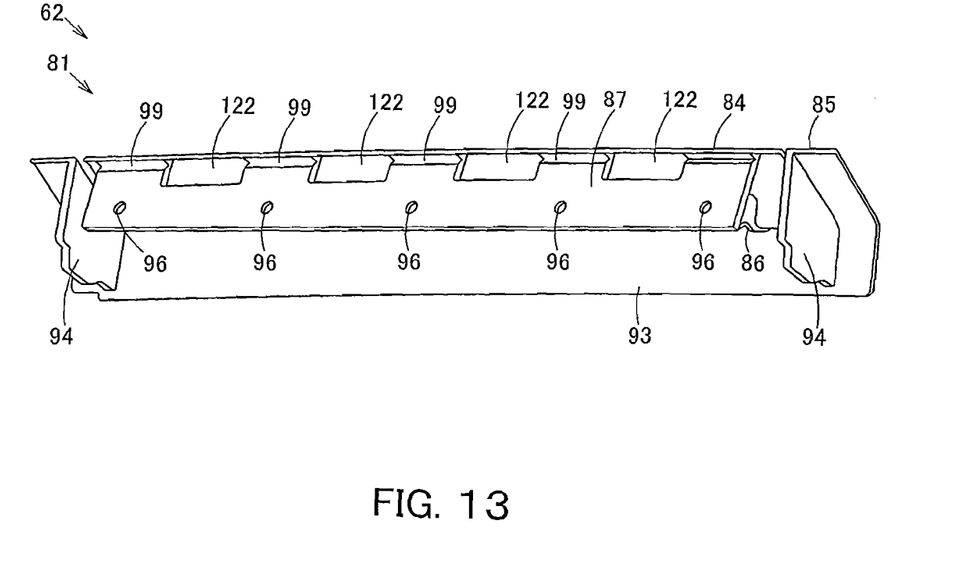
FIG. 13 is a perspective view showing the first backing part of the inner part of the cover body of an airbag apparatus which is further still another embodiment of the present invention.
Figure 14:
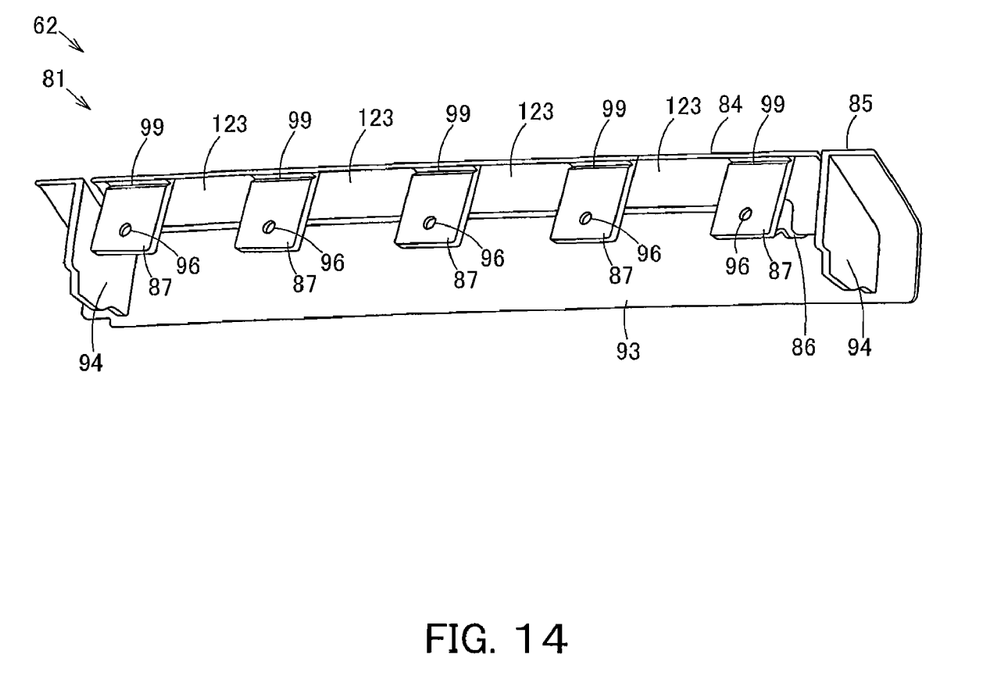
FIG. 14 is a perspective view showing the first backing part of the inner part of the cover body of an airbag apparatus which is still yet another embodiment of the present invention.

The slit part 121, which is a through hole, is not limited to a shape in which only the to-be-ripped part 99 is notched as shown in FIG. 12. However, for example, the slit part 121 can be formed into a rectangular opening 122 at which the supporting piece part 87 is partially notched as shown in FIG. 13 or it can be formed into a notch 123 at which the supporting piece part 87 is divided into a plurality of parts as shown in FIG. 14.

Further, the to-be-ripped part 99 is formed along an intermediate position in a height direction of the supporting piece part 87, that is, a position spaced away from the upper end part of the supporting piece part 87, by which on inflation and expansion of the airbag 31, the airbag 31 to be inflated and expanded is guided by the supporting piece part 87 which moves rotationally together with the upper face panel part 64. It is, therefore, possible to suppress interference of the airbag 31 with members other than the supporting piece part 87 of the cover body 22 and also guide the airbag 31 to the cabin external side. Further, the to-be-ripped part 99 is formed so as to be equal in height to a position at the lower end of the edge strip part 66 of the outer part 61, thus making it possible to suppress interference of the airbag 31 with other parts of the cover body 22, in particular, the edge strip part 66 protruded downward.

Still further, a description has been made for the cover body 22 which is to cover a part of the door part 1. However, the present invention shall not be limited to the constitution and includes a case where the cover body 22 may be formed as a door trim covering all over the door part 1.

In addition, the inflator and the airbag shall not be limited to the shape or the constitution described above. They may be used in various constitutions.

In terms of the industrial applicability, the present invention is applicable, for example, to an airbag apparatus equipped at the door part of an automobile.

What is claimed is:

1. An airbag cover body used in an airbag apparatus equipped with an airbag which is folded and accommodated in a door part on an inner side of a cabin and expanded upward along a side face part of the cabin upon introduction of gas, comprising:
an upper face panel part which covers an upper side of the folded and accommodated airbag;
a side face panel part projected downward from an edge part of a cabin internal side of the upper face panel part;
a first fitting/fixing part disposed at the side face panel part;
a supporting piece part protruded downward from a lower face of a cabin external side of the upper face panel part;
a second fitting/fixing part disposed at the supporting piece part; and
a to-be-ripped part which is disposed at the supporting piece part, located above the second fitting/fixing part and ripped by pressure resulting from expansion of the airbag.

2. The airbag cover body according to claim 1, wherein the upper face panel part is equipped with a resin-made surface part and a backing part which is integrally joined to the lower face of the surface part and is made of a resin softer than the surface part and the supporting piece part is formed integrally at the backing part.

3. The airbag cover body according to claim 1 comprising:
an edge strip part projected downward from the edge part of the cabin external side of the upper face panel part, wherein
the edge strip part is disposed so as to be spaced away on the cabin external side of the supporting piece part.

4. The airbag cover body according to claim 1, wherein the to-be-ripped part is formed along the upper end part of the supporting piece part.

5. The airbag cover body according to claim 1, wherein the to-be-ripped part is formed along a position which is spaced away from the upper end part of the supporting piece part.

6. An airbag apparatus comprising:
an airbag folded and accommodated in a door part on the inner side of a cabin and expanded upward along window parts on the side face part of a cabin upon introduction of gas;
an inflator which supplies gas into the airbag;
an airbag cover body which includes an upper face panel part covering the upper side of the folded and accommodated airbag, a side face panel part projected downward from the edge part of the cabin internal side of the upper face panel part to constitute an interior trim material of the door part, a first fitting/fixing part disposed on the side face panel part, a supporting piece part protruded downward from the lower face of the cabin external side of the upper face panel part, a second fitting/fixing part disposed on the supporting piece part and a to-be-ripped part disposed at the supporting piece part and positioned above the second fitting/fixing part to be ripped due to pressure resulting from the expansion of the airbag; and
a fitting body which supports the airbag and the inflator, provided with a first fitting/receiving part to which the first fitting/fixing part of the cover body is fitted and a second fitting/receiving part to which the second fitting/fixing part is fitted, and which is fitted to a member of the door part.

* * * * *